United States Patent
Gulen

(10) Patent No.: US 10,641,173 B2
(45) Date of Patent: May 5, 2020

(54) GAS TURBINE COMBINED CYCLE OPTIMIZED FOR POST-COMBUSTION $CO_2$ CAPTURE

(71) Applicant: Bechtel Power Corporation, Frederick, MD (US)

(72) Inventor: Seyfettin Can Gulen, Middletown, MD (US)

(73) Assignee: BECHTEL POWER CORPORATION, Frederick, MD (US)

( * ) Notice: Subject to any disclaimer, the term of this patent is extended or adjusted under 35 U.S.C. 154(b) by 772 days.

(21) Appl. No.: 15/142,783

(22) Filed: Apr. 29, 2016

(65) Prior Publication Data

US 2017/0268425 A1    Sep. 21, 2017

Related U.S. Application Data

(60) Provisional application No. 62/308,741, filed on Mar. 15, 2016.

(51) Int. Cl.
| | |
|---|---|
| *F02C 7/10* | (2006.01) |
| *F02C 3/34* | (2006.01) |
| *F01K 3/20* | (2006.01) |
| *F01K 23/10* | (2006.01) |

(52) U.S. Cl.
CPC ............... *F02C 7/10* (2013.01); *F01K 3/20* (2013.01); *F01K 23/103* (2013.01); *F02C 3/34* (2013.01); *F05D 2260/611* (2013.01); *Y02E 20/16* (2013.01); *Y02E 20/326* (2013.01)

(58) Field of Classification Search
CPC ...... F02C 7/10; F02C 3/34; F01K 3/20; F01K 23/103; F05D 2260/611; Y02E 20/16; Y02E 20/326
See application file for complete search history.

(56) References Cited

U.S. PATENT DOCUMENTS

| | | | | |
|---|---|---|---|---|
| 3,789,804 | A | * | 2/1974 | Aguet ................... F22B 1/1861 122/1 R |
| 4,058,974 | A | * | 11/1977 | Pfenninger ........... F01K 23/067 60/39.12 |
| 4,267,692 | A | | 5/1981 | Earnest |
| 5,553,556 | A | * | 9/1996 | Kruger ...................... F23G 5/14 110/211 |

(Continued)

*Primary Examiner* — Carlos A Rivera
(74) *Attorney, Agent, or Firm* — Duane Morris LLP

(57) ABSTRACT

In a gas turbine system including a first gas turbine generator, a heat recovery steam generator and a steam turbine generator heat rejection system, the present invention relates to a method for $CO_2$ capture from flue gas in said system, said method including: (a) diverting an amount of heat recovery steam generator flue gas from the $CO_2$ capture plant; and (b) mixing the diverted heat recovery steam generator flue gas with an air stream, forming a combined gas stream, wherein (1) the combined gas stream is fed to a second gas turbine generator; (2) exhaust gas from the second gas turbine generator is mixed with exhaust gas from the first gas turbine generator, forming a combined exhaust gas stream; and (3) the combined exhaust gas stream enters the heat recovery steam generator, with the $CO_2$ content of the combined exhaust gas stream increased through supplementary firing in the heat recovery steam generator.

8 Claims, 6 Drawing Sheets

(56) References Cited

U.S. PATENT DOCUMENTS

| | | | | |
|---|---|---|---|---|
| 5,649,416 A | * | 7/1997 | Moore | F01D 13/00 |
| | | | | 60/39.15 |
| 6,202,400 B1 | | 3/2001 | Utamura et al. | |
| 6,230,480 B1 | * | 5/2001 | Rollins, III | F01K 23/105 |
| | | | | 122/7 B |
| 8,850,789 B2 | | 10/2014 | Evulet et al. | |
| 2007/0130952 A1 | * | 6/2007 | Copen | F02C 6/02 |
| | | | | 60/772 |
| 2009/0145127 A1 | * | 6/2009 | Vollmer | F01K 23/103 |
| | | | | 60/618 |
| 2010/0180565 A1 | | 7/2010 | Draper | |
| 2011/0088399 A1 | * | 4/2011 | Briesch | F01K 23/10 |
| | | | | 60/728 |
| 2013/0091845 A1 | * | 4/2013 | Li | F02C 3/34 |
| | | | | 60/715 |
| 2014/0093351 A1 | * | 4/2014 | Motakef | F02C 7/143 |
| | | | | 415/1 |

* cited by examiner

GAS TURBINE COMBINED CYCLE OPTIMIZED FOR POST-COMBUSTION $CO_2$ CAPTURE

CROSS REFERENCE TO RELATED APPLICATION

This application claims the priority of U.S. provisional application Ser. No. 62/308,741, filed Mar. 15, 2016.

FIELD OF THE INVENTION

The present invention relates to removal of carbon dioxide from the stack (flue) gas of a gas turbine combined cycle power plant, which is designed to facilitate efficient and cost-effective implementation of a particular removal technology.

BACKGROUND OF THE INVENTION

Carbon dioxide ($CO_2$) constitutes the largest fraction of greenhouse gases (GHG), which are widely believed to be a major contributor to climate change. As such, significant research and development effort has been dedicated to reduce and/or eliminate emissions of $CO_2$ into the atmosphere. Combustion of fossil fuels, especially coal, in electricity generating power plants is a significant source of $CO_2$. To date, post-combustion $CO_2$ removal from the stack gases via deployment of aqueous amine-based absorber-stripper technology is the only commercially available option, which is applicable to new units as well as to retrofitting the existing plants.

The stack gas of a modern gas turbine combined cycle (GTCC) power plant with advanced F, H or J class units contains about 4% $CO_2$ by volume at near-atmospheric pressure (about 4.5% on a dry basis). Low flue gas pressure and density result in large volume flows requiring large piping, ducts and equipment, which are reflected in plant footprint and total installed cost. The only commercially available absorbents active enough for recovery of dilute $CO_2$ at very low partial pressures are aqueous solutions of alkanolamines such as monoethanolamine (MEA), diethanolamine (DEA), methyl-diethanolamine (MDEA) and the newly developed sterically hindered amines (e.g., piperazine).

In a fossil fuel-fired power plant with post-combustion capture, a continuous scrubbing system is used to separate the $CO_2$ from the flue gas stream by chemical absorption. The system consists of two main components:
an absorber in which the $CO_2$ is removed, and
a regenerator (stripper) in which the $CO_2$ is released in a concentrated form and the solvent is recovered.

Prior to the $CO_2$ removal, the flue gas (at around 90° C. at the heat recovery steam generator (HRSG) stack for the most efficient GTCC power plants) is typically cooled to about 50° C. and then treated to reduce particulates, that cause operational problems, and other impurities, which would otherwise cause costly loss of the solvent (e.g., in a direct contact cooler or "quench tower"). The amine solvent absorbs the $CO_2$ (together with traces of NOx) by chemical reaction to form a loosely bound compound. A booster fan (blower) is needed to overcome the pressure loss in the capture plant and is a significant (parasitic) power consumer.

The largest power consumption by the amine system is due to the large amount of heat required to regenerate the solvent. The temperature level for regeneration is normally around 120° C. This heat is typically supplied by steam extracted from the bottoming cycle and reduces steam turbine power output and, consequently, net efficiency of the GTCC plant significantly.

As for all other carbon capture technologies, electrical power is consumed to compress the captured $CO_2$ for transportation to the storage site and injection into the storage cavern.

Technologies for gas sweetening and syngas purification using alkanolamines have been extensively utilized in the chemical process industry (CPI) over the past century. Nevertheless, large-scale recovery of $CO_2$ from flue gas poses several serious challenges. Most important of these (for a GTCC plant), e.g., low $CO_2$ partial pressure and high regeneration energy, have already been mentioned. In addition, oxygen in the flue gas (about 12% by volume at the HRSG stack) can cause corrosion and solvent degradation (due to the absence of many impurities, which are amply present in coal-fired power plant flue gases, e.g., SOx (negligible), soot, fly ash and mercury, arguably the only significant degrading agent in GTCC flue gas is oxygen). While inhibitors have been reasonably effective in mitigating these effects, the need for continuous removal of unavoidable solution contaminants adds to operating costs.

Thus, in a natural gas-fired GTCC framework, post-combustion $CO_2$ capture plant design challenges are as follows:
to minimize regeneration energy by selecting a solvent with a relatively low reaction energy;
to use the lowest possible exergy steam extraction to provide the requisite energy;
to cool the gas turbine exhaust gas to the lowest possible temperature in the HRSG;
to maximize the $CO_2$ content of the HRSG stack gas; and
to minimize the $O_2$ content of the HRSG stack gas.

SUMMARY OF THE INVENTION

The present invention meets three key design challenges of post-combustion $CO_2$ capture from the stack gas of a GTCC power plant using aqueous amine-based scrubbing method by offering the following:
Low HRSG stack gas temperature;
Increased HRSG stack gas $CO_2$ content; and
Decreased HRSG stack gas $O_2$ content.
This is achieved by combining two bottoming cycle modifications in an inventive manner: High supplementary (duct) firing in the HRSG; and recirculation of the HRSG stack gas.

In a gas turbine system including a first gas turbine generator, a heat recovery steam generator and a steam turbine generator, the present invention relates to a method for $CO_2$ capture from flue gas in said system, said method comprising: (a) diverting an amount of heat recovery steam generator flue gas from the $CO_2$ capture plant; and (b) mixing the diverted heat recovery steam generator flue gas with an air stream, forming a combined gas stream, wherein (1) the combined gas stream is fed to a second gas turbine generator; (2) exhaust gas from the second gas turbine generator is mixed with exhaust gas from the first gas turbine generator, forming a combined exhaust gas stream; and (3) the combined exhaust gas stream enters the heat recovery steam generator, with the $CO_2$ content of the combined exhaust gas stream increased through supplementary firing in the heat recovery steam generator.

BRIEF DESCRIPTION OF THE DRAWINGS

The drawings depict a number of arrangements and alternatives as illustrative examples but should be regarded as non-limiting. The invention is also capable of other configurations in accordance with the claims. In the drawings:

DETAILED DESCRIPTION OF THE INVENTION

Figure 1:
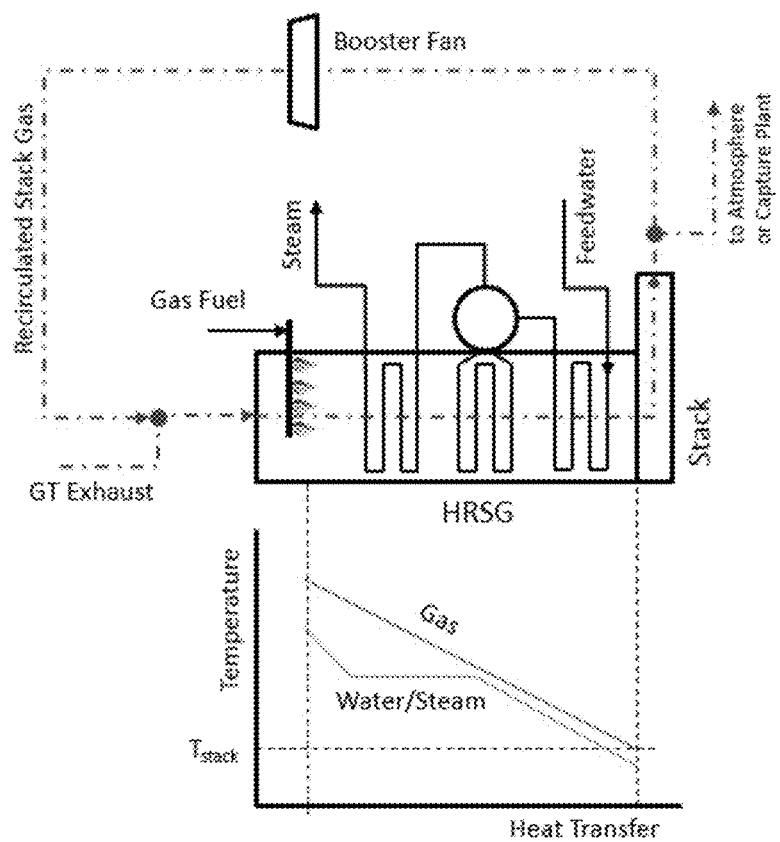
FIG. 1 is a diagram of a one-pressure HRSG with duct firing and stack gas recirculation.

The mechanism for suppression of stack gas temperature in the HRSG via duct firing can be explained by the heat release (T-Q) diagram in FIG. 1. The x-axis of the T-Q diagram is the total heat transfer in Btu/s (or kW thermal, kWth). The y-axis is the temperature. GT exhaust gas enters the HRSG on the left and exits through the stack on the right (i.e., gas flow is from left to right). Feed water and steam flow is in the opposite direction (i.e., from right to left) comprising three distinct phases:
  (i) economizing;
  (ii) boiling/evaporation (constant pressure and temperature); and
  (iii) superheating.

Cooling of GT exhaust gas and generation/superheating of steam can be traced by their respective heat release lines on the T-Q diagram. In a single-pressure system, the nearly-linear gas heat release line (in reality, it has a slight curvature due to the change in specific heat with temperature) is analogous to a simple beam rotating around its support point, i.e., the evaporator pinch point (where gas and water/steam temperatures are closest to each other). As the gas inlet temperature (and energy content) increases via supplementary firing, more and more steam is generated. The result is increasing energy removal from the flue gas with decreasing stack temperature (i.e., left end of the beam—gas T-Q line—goes up while the right end goes down).

Figure 2:
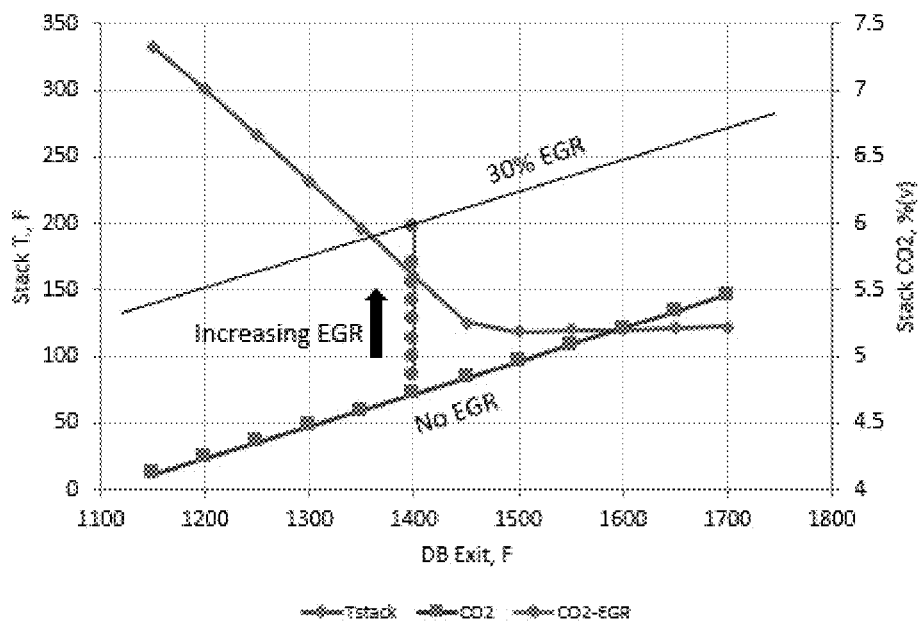
FIGS. 2 and 3 are graphs showing stack gas temperature and $CO_2$ content.

For a simple HRSG (no reheat) generating 1,800 psig and 1,112° F. steam, the impact of increasing duct burner (DB) exit temperature on stack gas temperature and $CO_2$ content is shown in FIG. 2. Gas turbine exhaust temperature is 1,150° F.

Figure 3:
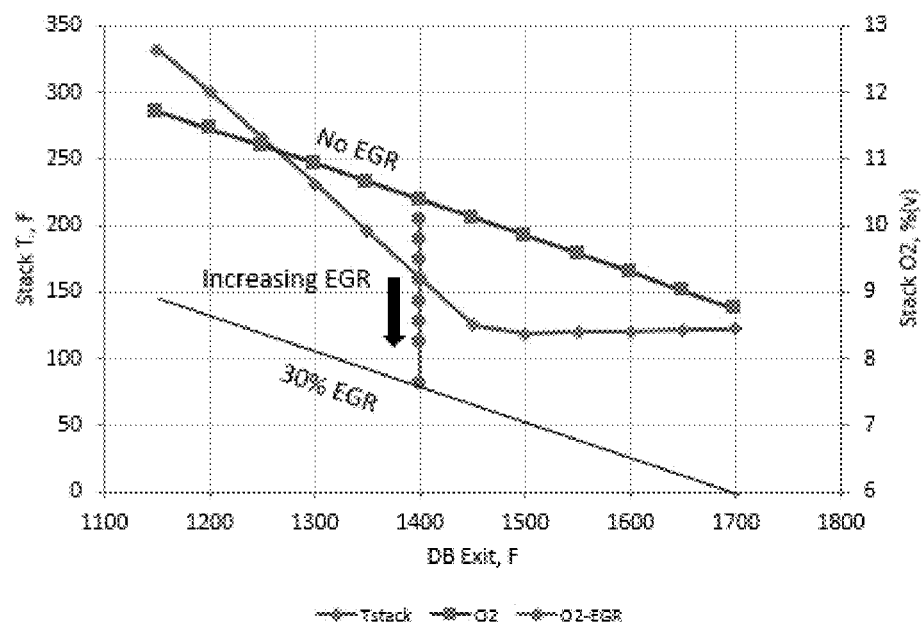

Increasing gas temperature from 1,150° F. (no duct firing) to 1,700° F. increases the $CO_2$ content from slightly above 4% (v) to 5.5% (v) while decreasing the stack temperature from about 330° F. to about 120° F. (limited by the gas dew point). Further increase in $CO_2$ content is achieved by recirculating a portion of the HRSG stack gas back to the inlet duct (upstream of the duct burner). This is a technique known as Exhaust Gas Recirculation (EGR) and widely used in internal combustion engines. At 30% recirculation, $CO_2$ content of the HRSG stack gas is increased by an additional 1.25% (v) points. The increase in $CO_2$ content comes at the expense of a decrease in $O_2$ content as shown in FIG. 3.

As discussed above, all three effects, i.e., lower stack temperature, higher flue/stack gas $CO_2$ content and lower $O_2$ content, are advantageous for the size and cost of the post-combustion capture plant. However, this advantage comes at the expense of parasitic power consumption of the booster fan (BF) facilitating the recirculation of the HRSG stack gas. Depending on the size and length of the recirculation duct and the HRSG, this can impose a penalty of about 2-3 kW or more per lb/s of circulated flue gas.

Figure 4:
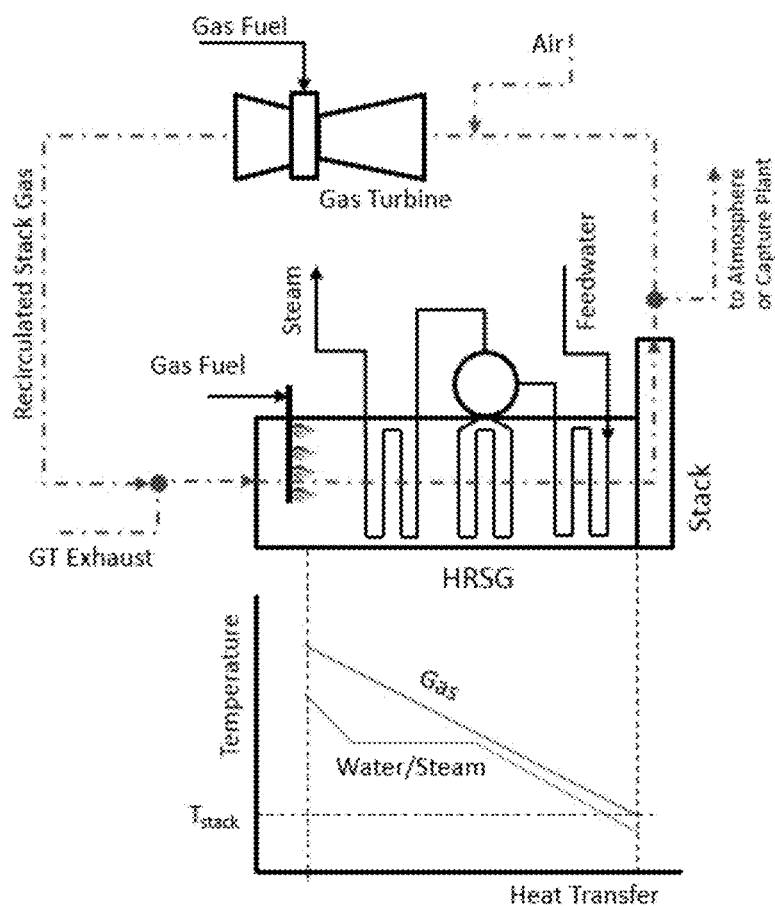
FIG. 4 is a diagram showing a one-pressure HRSG with duct firing and gas turbine-assisted stack gas recirculation.

The present invention replaces the booster fan by another GTG (see FIG. 4). In addition to eliminating the parasitic power loss, this modification further increases the flue gas $CO_2$ content while further decreasing the flue gas $O_2$ content (see Table 1). This is a direct result of the third combustion process in the system (in addition to the main GTG combustor and the HRSG duct burner).

Furthermore, as will be shown below, addition of the second GTG significantly increases net electric power output, before and after capture.

For the invention, HRSG gas flow can be as high as 200% of the main GTG exhaust flow if the recirculation GTG is of the same size as the main GTG.

Figure 5:
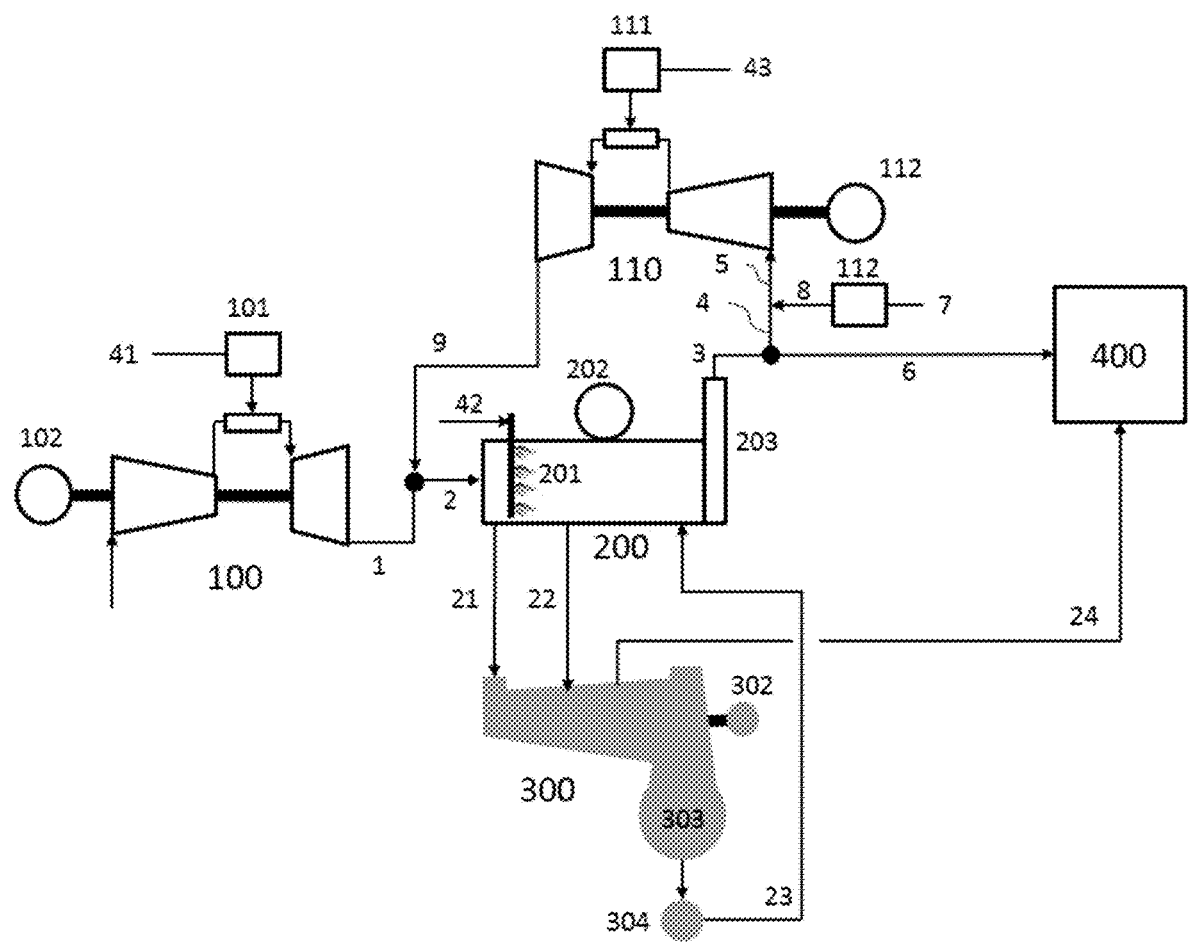
FIG. 5 is a system diagram showing an embodiment of the invention.

A detailed system diagram is shown in FIG. 5. This diagram is used to explain features of the invention and how they are implemented to result in a final coherent system.

The gas turbine combined cycle system of the invention comprises the following major components:
  (i) Main gas turbine generator (100)
  (ii) Single-pressure heat recovery steam generator with reheat and supplementary firing (200)
  (iii) Steam turbine generator (300)
  (iv) Recirculation gas turbine generator (110)

Main gas turbine generator (GTG) 100, HRSG 200 and steam turbine generator (STG) 300 comprise the current state-of-the-art in terms of a gas turbine combined cycle plant arrangement. GTG 100 generates electric power through its generator 102 by combustion of fuel stream 41, which is heated in a performance heater 101. Exhaust gas stream 1 from GTG 100 enters the HRSG 200. Its energy is increased by the duct burner (DB) 201 via combustion of fuel stream 42. The energy is utilized in the HRSG 200 to generate superheated steam by cooling the hot gas. Cooled gas stream 3 exits the HRSG through its stack 203. Main steam 21 and hot reheat steam 22 from the HRSG 200 are expanded in the STG 300 to generate further electric power (generator 302). Feed water 23 from the STG 300 through condenser 304 is pumped back to the HRSG 200 to complete the cycle. Stack gas stream 3 is forwarded to a post-combustion carbon dioxide capture plant (CCP) 400.

The present invention includes a diversion of a portion of HRSG stack gas 3, stream 4, from the CCP 400. Diverted gas 4 is mixed with air stream 8, which is ambient air 7 cooled in an evaporative cooler 112. The remainder gas stream 6 is forwarded to the CCP 400. The combined gas stream 5 is the motive air of the recirculation GTG 110, which generates further electric power (generator 112) via combustion of fuel stream 43, which is heated in a performance heater 111. The exhaust gas 9 from the GTG 110 is mixed with the exhaust gas 1 from the main GTG 100. The combined exhaust gas stream 2 enters the HRSG 200 and its energy is increased by the DB 201 via combustion of fuel stream 42. The rest of the steam cycle is similar to the current state-of-the-art.

Carbon capture plant 400 can be based on any post-combustion capture technology. It can be inclusive of $CO_2$ compression and conditioning for pipeline transportation to the final storage or usage location (e.g., sequestration cavern, oil field for enhanced oil recovery (EOR), etc.). It can include electric motor-driven equipment such as compressors, pumps, etc., whose power consumption is debited to the gross power generation of the GTCC power plant. It can utilize steam at specified pressures and temperatures to provide energy requisite for capture processes. Steam requirements of the CCP are met by steam extracted from suitable locations in the bottoming cycle of the GTCC, e.g., the HRSG and/or the STG. One example is low pressure (LP) steam extraction from the STG, which is shown in FIG. 5 (stream 24). There may be other similar streams at different pressures and/or temperatures.

Alternative embodiments on the configuration in FIG. 5 are possible. For example:
  (i) There can be two or more recirculating GTGs in parallel instead of only one;
  (ii) There can be two or more STGs in parallel instead of one;
  (iii) There can be two or more HRSGs fed by a single main GTG;
  (iv) There can be two or more HRSGs, each fed by its own main GTG;
  (v) The exhaust from each HRSG can be recirculated by its own recirculating GTG or they can be combined and recirculated by one recirculating GTG;
  (vi) Each HRSG can feed its own STG or all HRSGs can feed a single STG;
  (vii) The HRSG can be a drum-type design (with the steam drum 202) or a once-through (e.g., Benson type) design without a drum;
  (viii) The HRSG can be a horizontal unit (as implied by the conceptual drawing in FIG. 5) or a vertical unit;
  (ix) The steam cycle can be subcritical (i.e., steam pressure is below the critical pressure of $H_2O$) or supercritical (in which case a once-through HRSG design is requisite);
  (x) The STG configuration can be one of myriad possibilities incorporating multiple high pressure (HP), intermediate pressure (IP) and LP casings (double-flow, four-flow, etc.);
  (xi) The STG condenser 303 can be one of myriad possibilities, i.e., water-cooled or air-cooled, with or without a cooling tower, hybrid, etc.

The recirculation GTG supplementary air stream 7 requires cooling for optimal gas turbine performance. This is especially important for plant operation on hot days. The inlet cooler 112 in FIG. 5 can be an evaporative cooler. However, it can also be one of myriad possibilities including electric chiller, absorption chiller (utilizing steam or hot water extracted from the HRSG or the STG) among others.

GTG 110 can be identical to GTG 100 or it can be of a different type and size (model). Fuel streams 41 and 43 can be of the same type (e.g., both natural gas) or different (i.e., one natural gas and the other distillate). Similarly, the HRSG duct burner 201 can use the same fuel as the GTGs or a different one.

Another important design parameter subject to optimization is the duct burner exit gas temperature. For a given steam pressure and evaporator pinch point temperature difference, the amount of duct firing dictates the stack gas temperature and economizer heat transfer surface area (i.e., HRSG size and cost). With proper design, temperatures up to 2,000° F. have been achieved (cf. modern H or J class gas turbine exhaust gas temperatures are 1,150° F. to ~1,200° F.). 1,600° F. is used in calculations to demonstrate the significance of the invention.

The location of the duct burner is also a design and optimization consideration. It can be located upstream of the first superheater (i.e., at HRSG inlet). However, with the upfront burners in the large HRSGs, steam temperature of the final stage of superheater and/or reheater sections may become too high and require excessive attemperation (desuperheating). Normal practice is to use inter-stage burners (somewhere between superheater and reheater sections) for better temperature regime of the sections facing the burner. The governing design philosophy is to locate the burner such that it sees the section with a low enough steam temperature to avoid hot spots. (In the case of a 2,000° F. duct burner, for example, the downstream section was the HP evaporator.) Selection of appropriate tube and fin materials, burner duct insulation, minimizing temperature deviations from average at the burner outlet, etc. are all parts of a final, feasible design. If necessary, multiple duct burners in series (e.g., one inter-stage DB and one upstream of the evaporator) can be utilized.

Regarding HRSG stack gas (exhaust gas) recirculation (EGR) rate, as a fraction of total stack gas, a higher EGR (although beneficial from a stack gas $CO_2$ and $O_2$ content perspective) results in warmer motive air for the recirculation GTG 110 (plus with reduced $O_2$ for the combustor). 30% EGR is used in calculations to demonstrate the significance of the invention. This is believed to be roughly the optimal rate, which is estimated to
  Reduce capture penalty by more than 15%; and
  Reduce specific capital cost ($/kW) by about 35%.

Figure 6:
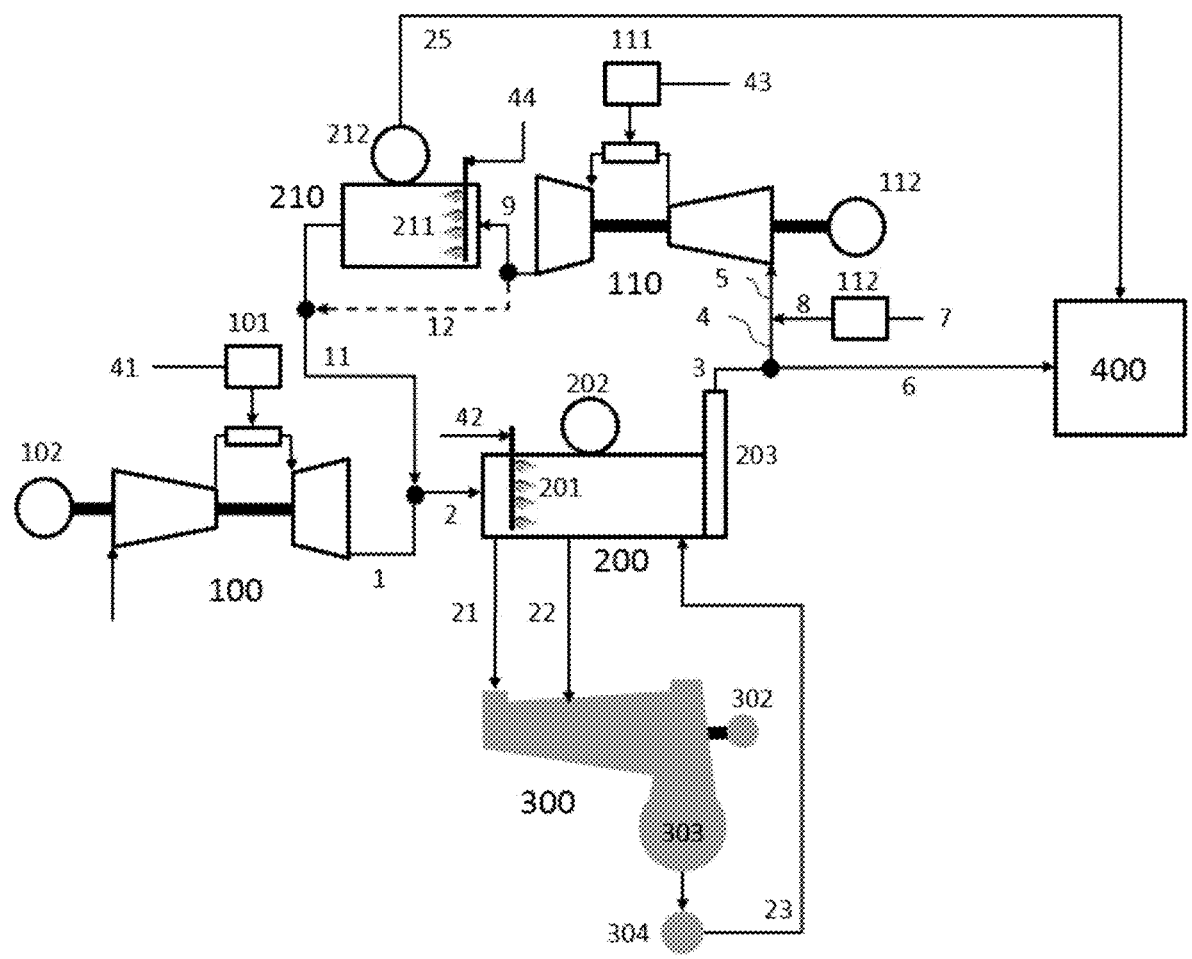
FIG. 6 is a system diagram of an alternative embodiment of the invention with a heat recovery steam generator downstream of the recirculation gas turbine generator (GTG).

A second embodiment of the invention is shown in FIG. 6. This embodiment adds to the embodiment as shown in FIG. 5, and includes a dedicated heat recovery steam generator 210, if necessary equipped with a duct burner 211, which generates low pressure (LP) steam for the stripper reboiler of CCP 400.

In this embodiment, exhaust gas 9 of GTG 110 is fed to a single-pressure (no reheating or superheating) HRSG, whose purpose is to generate the LP steam demanded by the stripper reboiler of the CCP 400. Depending on the exact configuration and site ambient/loading conditions, supplementary firing via duct burner 211, consuming fuel stream 44, may be necessary. LP steam generated in HRSG 210 is supplied from drum 212 to CCP 400 (stream 25). Exhaust gas from HRSG 210, stream 11, is mixed with exhaust gas 1 from GTG 100 and the resulting gas stream 2 is fed to HRSG 200. In this way, the entire connection between CCP 400 and the bottoming cycle (STG 300 and HRSG 200) is broken. (Note that condensate return from CCP 400 is not shown for simplicity.) This leaves the gas duct (stream 6 in the diagrams in FIG. 5 and FIG. 6) as the only connection between the GTCC and CCP 400. This simplifies the operability of the entire system and, furthermore, it makes the disconnection of CCP 400 from the GTCC straightforward (in case of a malfunction or scheduled maintenance). In such a case, there are two options:
  (i) Exhaust gas from GTG 110 can bypass HRSG 210 via a separate bypass duct (stream 12); and
  (ii) HRSG 210 can be equipped with a bypass stack (not shown), which directs exhaust gas stream 9 from GTG 110 to the atmosphere.

Even though there is no steam turbine power output loss in conjunction with energy supplied to CCP 400 (in the form of LP steam), there is a penalty in the form of excess fuel consumption in duct burners 201 and 211. This embodiment is estimated to reduce the capture penalty by almost 65% while reducing the specific capital cost ($/kW) by about 35%. Note that the temperature of mixed gas stream 2 entering HRSG 200 is significantly lower in the embodiment shown in FIG. 6 due to the much cooler exhaust gas stream 11 (vis-à-vis exhaust gas stream 9).

Similar to the main HRSG 200, HRSG 210 can be of any particular design configuration (drum-type or once-through, vertical or horizontal, etc.) and duct burner fuel stream 44 could be of any type (e.g., natural gas, distillate, etc.) Exact amount EGR, as a fraction of total stack gas, amount of supplementary firing in duct burner 211, etc. are subject to optimization on a case-by-case basis.

The invention has been disclosed in connection with certain embodiments disclosed as examples, but it should be understood that the invention is not limited to the exemplary embodiments. Reference should be made to the appended claims to assess the scope of the invention in which exclusive rights are claimed.

What is claimed is:

1. A method for $CO_2$ capture from flue gas in a gas turbine system including a first gas turbine generator, a heat recovery steam generator and a steam turbine generator heat rejection system, the method comprising:
    diverting an amount of heat recovery steam generator stack gas from a CO2 capture plant; and
    mixing the diverted heat recovery steam generator stack gas with an air stream, thereby forming a combined gas stream;
    feeding the combined gas stream to a second gas turbine generator;
    mixing exhaust gas from the second gas turbine generator with exhaust gas from the first gas turbine generator, thereby forming a combined exhaust gas stream; and,
    applying the combined exhaust gas stream to the heat recovery steam generator, wherein a $CO_2$ content of the combined exhaust gas stream is increased by supplementary duct burner firing in the heat recovery steam generator,
    wherein the temperature of the combined gas stream exiting the supplementary duct burner is maintained at about 1,600° F. and the heat recovery steam generator is one of a drum-type or a once-through generator,
    the method further comprising feeding a supplemental air stream to the second gas turbine generator, and cooling the supplemental air stream using an inlet cooler.

2. The method as recited in claim 1, wherein the inlet cooler comprises at least one of an evaporative cooler, an electric chiller or an absorption chiller.

3. The method as recited in claim 1, wherein the steam turbine generator heat rejection system is at least one of water-cooled or air-cooled.

4. A method for $CO_2$ capture from flue gas in a gas turbine system including a first gas turbine generator, a first heat recovery steam generator and a steam turbine generator heat rejection system, said method comprising:
    diverting an amount of heat recovery steam generator stack gas from a CO2 capture plant; and
    mixing the diverted heat recovery steam generator stack gas with an air stream, thereby forming a combined gas stream, wherein
    the combined gas stream is fed to a second gas turbine generator;
    exhaust gas from the second gas turbine generator is fed to a second heat recovery steam generator;
    steam generated in the second heat recovery steam generator is sent to the $CO_2$ capture plant;
    exhaust gas from the second heat recovery steam generator is mixed with exhaust gas from the first gas turbine generator, forming a combined exhaust gas stream; and
    the combined exhaust gas stream enters the first heat recovery steam generator, with a $CO_2$ content of the combined exhaust gas stream increased through supplementary duct burner firing in the first heat recovery steam generator,
    wherein the temperature of the combined gas stream exiting the supplementary duct burner is maintained at about 1,600° F.,
    the method further comprising feeding a supplemental air stream to the second gas turbine generator, and cooling the supplemental air stream using an inlet cooler.

5. The method as recited in claim 4, wherein the inlet cooler comprises at least one of an evaporative cooler, an electric chiller or an absorption chiller.

6. The method as recited in claim 4, wherein the first heat recovery steam generator comprises one of a drum-type or a once-through steam generator.

7. The method as recited in claim 4, wherein the second heat recovery steam generator comprises one of a drum-type or a once-through steam generator.

8. The method as recited in claim 4, wherein the steam turbine generator heat rejection system is one of water-cooled or air-cooled.

* * * * *